United States Patent
Pompon

[11] 3,849,202
[45] Nov. 19, 1974

[54] METHOD OF MANUFACTURING A METAL-AIR BATTERY

[75] Inventor: Jean-Paul Pompon, Vitry sur Seine, France

[73] Assignee: Compagnie General D'Electricite, Paris, France

[22] Filed: Dec. 20, 1972

[21] Appl. No.: 316,785

[30] Foreign Application Priority Data
Dec. 20, 1971 France .............................. 71.45734
June 26, 1972 France .............................. 72.22961

[52] U.S. Cl. ............................. 136/86 A, 136/86 A
[51] Int. Cl. ......................................... H01m 27/00
[58] Field of Search ..... 136/86 A, 86 R, 86 D, 86 E

[56] References Cited
UNITED STATES PATENTS

| | | | |
|---|---|---|---|
| 3,256,116 | 6/1966 | Justo et al. | 136/86 E |
| 3,311,504 | 3/1967 | Johnson | 136/86 R |
| 3,316,126 | 4/1967 | Leduc | 136/86 A |
| 3,457,115 | 7/1969 | Kent | 136/86 A |
| 3,595,700 | 7/1971 | Rosansky | 136/86 A |

*Primary Examiner*—Winston A. Douglas
*Assistant Examiner*—H. A. Feeley
*Attorney, Agent, or Firm*—Sughrue, Rothwell, Mion, Zinn & Macpeak

[57] ABSTRACT

Electrochemical storage battery of the forced flow type comprising several reaction elements of tubular shape inside which the electrolyte containing zinc in suspension flows, such elements comprising, more particularly inside a copper negative collector in contact with an insulating separator, and outside a positive collector formed by a grid of unfolded metal surrounding the active layer and pressed tight against that layer subsequent to axial traction having caused plastic deformation.

5 Claims, 5 Drawing Figures

METHOD OF MANUFACTURING A METAL-AIR BATTERY

The invention concerns electrochemical storage batteries in which a powdered metal in suspension in an alkaline solution is brought by forced flow of that suspension, into contact with a negative metallic collector on which it is electrochemically oxidised, and in which an oxidising gas is brought into contact with a porous positive electrode within which it is reduced by contact with the alkaline solution. The negative collector is immersed in the alkaline solution. The positive electrode is in the form of a layer called the active layer, inserted between a separator constituted by a porous hydrophilic insulating layer and a water repellent layer. The separator is immersed by one of its faces in the alkaline solution. Its function is to avoid electronic conduction between the powdered metal and the active layer while enabling the alkaline solution to reach that active layer. The water repellent layer is immersed by one of its faces in the space filled by the oxydising gas. Its function is to prevent the alkaline solution in which the active layer is immersed from passing partly into that space, which may be called the "outside space," the space filled with the alkaline solution then being called the "inside space."

Storage batteries such as those which have just been described, of the zinc-air type, for example, have been designed more particularly for supplying propulsive power to highway vehicles.

With a view to increasing the available power, which is substantially proportional to the area of the active layer, it is a known method to give that layer the shape of a rectangular plate, and to the negative collector, the shape of a rectangular plane grid parallel to that plate and having the same surface. Thus, a reaction element whose thickness may be slight if the distance between the active layer and the negative collector is short is constituted. An electrochemical storage battery consists of a stack of such reaction elements. That structure is not, however, satisfactory, in as much as concerns both the simplicity of construction of the storage battery and the ratio between the capacity and the power.

Moreover, as the speed of the solution containing zinc in suspension is not the same everywhere, zinc tends to form deposits in the zones where that speed is the lowest.

The aim of the present invention is to provide a more satisfactory solution.

The present invention has for its object an electrochemical storage battery of the forced flow type comprising several reaction elements each comprising a wall separating an "inside" space from an "outside" space, means connected to each of these reaction elements for making an alkaline solution containing a powdered metal in suspension flow inside the said inside space, and means for making an oxidising gas flow in the said outside space. Each of the above-mentioned walls in turn comprising, from the inside towards the outside, firstly, a porous hydrophilic insulating separator which is unalterable and impervious to the said powdered metal; secondly, an active porous and electrically conductive layer, enabling, within itself, a reduction reaction for the said oxidising gas in the alkaline solution; and thirdly, a water repellent, porous and unalterable layer constituting a metallic positive collector which is unalterable and highly permeable and which is in electrical contact with the said active layer. Finally, an unalterable metallic negative conductor is placed in the said inside space, and this storage battery is characterised in that the said wall is in the shape of a tube whose cross-section has the shape of a closed curve, the said inside space being placed inside that tube, and the said outside space being placed on the outside of that tube. Additionally, the said negative collector has the shape of a highly permeable layer applied against the inside face of the said separator.

According to a first embodiment, the said negative and positive collectors are both constituted by a grid made of an unalterable substance, preferably a nickel compound or stainless steel.

According to a second embodiment, the said negative collector is constituted by a fine grid surrounding a large grid capable of bearing a radial compression stress and is constituted at least on the surface by a metal comprising at least 50 percent copper, whereas the said positive collector is constituted by a fine grid surrounded by a sleeve made of an unalterable metal capable of undergoing plastic deformation, and perforated with holes so that the metal segments remain between the holes not forming any continuous line parallel to the axis of the sleeve throughout its whole length.

The cross-section of the previously mentioned tube is, to great advantage, circular. The previously mentioned powdered metal is, to great advantage, zinc, the said alkaline solution being a potash solution and the said oxidising gas containing oxygen.

One noteworthy characteristic of such a storage battery is that the electrolyte, that is, the potash solution containing the zinc, flows in a zone different from that in which the ionic exchanges take place. Indeed, the flow zone is constituted by the space inside the negative collector, whereas the zone where the ionic exchanges take place is constituted by the separator impregnated by the potash solution, and, partly, by the active layer. In that arrangement, there is no gap between the metallic negative collector and the separator. The result is, more particularly, the cancelling of all erosion of the separator by the zinc powder in suspension, without the necessity, forasmuch of producing a negative collector which is impervious to zinc, it being understood that it must in any case be permeable to the solution. That advantage is obviously connected with the fact that the separator is an electronic insulator so as to avoid, on the one hand, a short circuit between the electrodes, that is, between the negative collector and the positive collector, and, on the other hand, a discharge, that is, a direct oxidisation of the zinc power in contact with the positive collector.

The separator, moreover, acts as a stop layer, that is, in the case of excessive gas pressure in the space outside the tubular element, it prevents, by capillary pressure, the oxidising gas from coming into the space inside the tubular element. The function of the separator is therefore more important than that of the distance elements used in former devices for keeping a certain distance between the active layer and the negative collector.

Inasmuch as concerns the use of copper according to the second embodiment, such a metal has, indeed, greater hydrogen supertension than nickel or stainless steel. It is known that the higher the hydrogen supertension of of a metal is, the more difficult it is to obtain a freeing of hydrogen by electrolysis of a solution in which that metal may assume the function of negative electrode. During the normal operation of the electrochemical storage battery according to the invention, the negative collector is brought to a potential more negative than the theoretical potential enabling the freeing of hydrogen. The result is a possibility of decomposing the water in the solution. It is an advantage to make the corresponding freeing of hydrogen at the negative collector as slight as possible for several reasons:

Firstly, the output of the electrochemical storage battery is increased thereby, since electrolysis consumes the current which is to be produced. Then, the freeing of hydrogen at the level of the negative collector promotes the baring of the surface of that collector which the zinc flowing in a suspension tends naturally to cover entirely. The zones of the negative collector which are bared have the disadvantage of enabling a freeing of hydrogen on the one hand, and on the other hand of being eroded by the particles of zinc which strike against them. Due to the choice of a negative collecting surface made of copper or an alloy containing more than 50 percent of copper, that surface remains entirely covered with zinc. It must be understood that this zinc is consumed during the operation of the electrochemical storage battery, but the zinc consumed is constantly replaced by zinc coming from the flowing suspension and being deposited on the negative collector.

The use of copper therefore enables the freeing of hydrogen to be reduced, the energy output to be increased and abrasion of the negative collector to be avoided.

Other characteristics and advantages of the invention will become apparent from the following description only by way of an illustrating example having no limiting character, with reference to the accompanying drawings and diagrams, in which.

Figure 1:
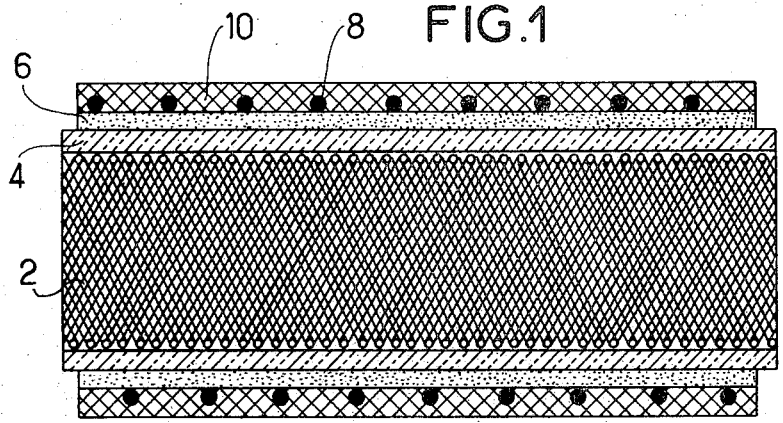
FIG. 1 shows a longitudinal cross-section of a reaction element according to a first embodiment of the invention.
Figure 2:
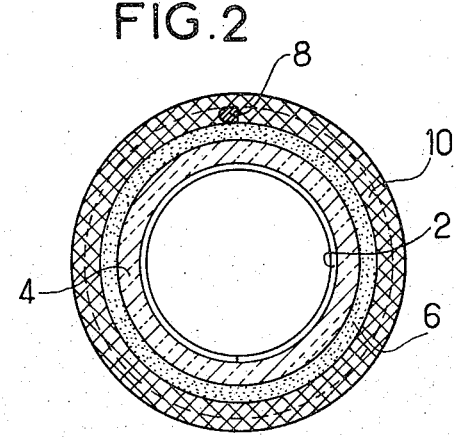
FIG. 2 shows a transversel cross-section of that same element.

FIGS. 1 and 2 show the wall of a reaction element having a tubular shape and a circular cross-section. A potash solution containing zinc powder in suspension may cross it. That element comprises, from the inside towards the outside, an unalterable metallic negative collector constituted by a grid 2 made of nickel or stainless steel for example, resistant to potash. That grid, which is connected to the negative terminal of the storage battery, enables the negative charges resulting from the transforming of the metallic zinc into ions to be collected. It enables the solution to reach easily a separator 4 which may be formed by a ceramic substance, asbestos or a plastic substance, and is porous, insulating, hydrophilic, that is, the penetrating of the potash solution is thereby made easier; it is unalterable by that solution and impervious to the zinc powder. An active layer 6 constituted by active carbon with low-concentration silver is arranged against the outside face of that separator, which acts as a metal support. The function of that active layer is to enable, within that layer, the reducing reactions of the oxidising element contained in the previously mentioned oxidising gas.

In the example described, that gas is air.

The active layer must be porous to enable simultaneously the penetration of the air and the solution. It may have a thickness in the order of a tenth of a millimetre. It must have a certain electronic conductivity so as to enable, without excessive voltage drop, the flow of the current at least up to an unalterable metallic positive conductor constituted by a grid 8, made of nickel or stainless steel, for example, applied on the outside face of that active layer and connected to the positive terminal of the generator. That positive collector and the active layer 8 are coated in a water repellent layer 10 which is porous and unalterable. The function of that layer 10 is to prevent the solution from being diffused towards the outside of the reaction element, while enabling air to reach the active layer 6. That outside layer is constituted, in the example described, by porous polytetrafluorethylene. The elements which have just been described and which constitute a reaction element form a coaxial structure mechanically connected to the electrochemical storage battery assembly by the ends of the separator 4.

Figure 3:
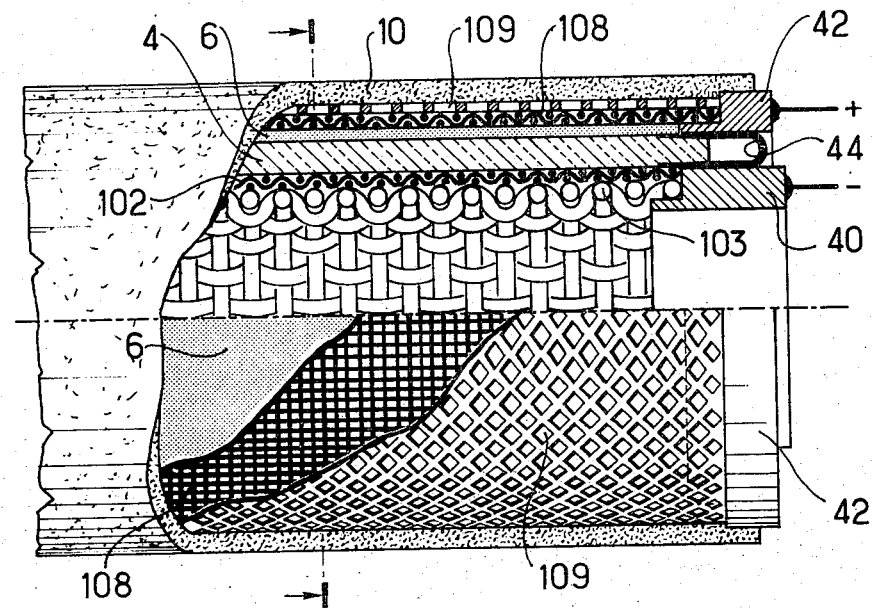
FIG. 3 shows a longitudinal cross-section of a reaction element according to a second embodiment of the invention, a half cross-section being shown at the upper portion, and an elevation with cut away portions at several levels being shown at the lower portion.
Figure 4:
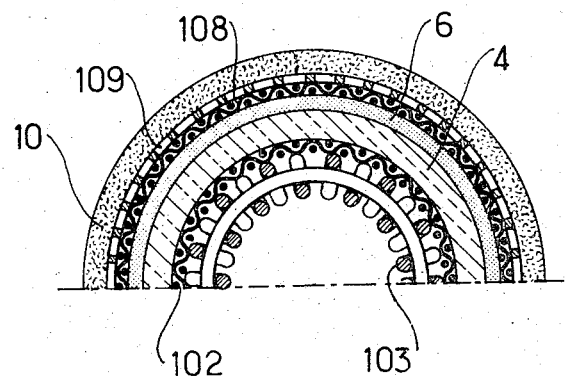
FIG. 4 shows a transversel cross-sectional view of that same element.

According to the second embodiment, FIGS. 3 and 4 show an element which also has a tubular shape and a circular cross-section through which a potash solution containing powdered zinc in suspension may flow. That element is constituted by coaxial cylindrical layers in contact with one another, more particularly from the inside towards the outside, a large grid 103, constituted by copper wire having a cross-section in the order of a millimetre spaced a few millimeters apart. That grid 103 has, among other functions, a mechanical function. It must, as will be explained further on, be able to withstand a radial pressure which is exerted on the element as a whole during the manufacturing thereof. A fine grid 102, which is also constituted by copper wires, with a diameter of a few tenths of a millimetre and a spacing of a few tenths of a millimetre is arranged round that large grid 103. It has, among other functions, the function of distributing the pressures which may be exerted by the large grid 103. It would be possible to use, in order to constitute the grids 102 and 103, not only copper, but also a copper alloy such as bronze or brass for example. The negative collector is constituted by the grids 102 and 103 as an assembly. It is connected to the negative terminal of the storage battery and enables the negative charges which result from the transforming of the zinc metal into ions to be collected. The grids 102 and 103 enable the potash solution to reach the separator 4 easily. The active layer 6 also constituted by active carbon with slight concentration silver is laid against the outside face of that separator.

The positive collector is constituted by a large grid or sleeve 109 fitting tight round a fine grid 108. These two grids are made of nickel or stainless steel, or even of another metal, on condition, inasmuch as concerns the large grid, that plastic deformations be possible easily, that is, that the metal be not too fragile and not too resilient. The fine grid 108 has the most conventional shape for grids, that is, it consists of wires having a circular cross-section of a few tenths of a millimetre in diameter with a spacing of a few tenths of a millimetre. It has a distributing function for the efforts exerted on the active layer 6 by the large grid 109. The latter is formed by a metal sleeve perforated with holes, constituted, for example, by expanded metal or the like. It is known that it is possible to obtain a sheet of expanded metal as follows: a metal sheet having a suitable thickness is provided. Lines which are parallel to one another and regularly spaced out are traced on that metal sheet. A regular succession of slots crossing the metal sheet are formed on each of these lines. These slots are rectilinear, directed along the line and leave, between them, relatively short gaps which do not have slots. All the slots and all the intervals between the slots have the same length. The intervals between the slots of one line are arranged facing the slots of the two lines on either side. The metal sheet is then subjected to traction in the direction perpendicular to that of the lines. That traction is sufficiently great for the metal to undergo plastic deformation. Each of the slots is then transformed into a hole in the shape of a diamond. This produces a perforated metal sheet having an aspect somewhat like that of a grid. Of course, it is possible to obtain a similar result with metal wires suitably welded together.

The large grid 109 may nevertheless have a different shape, it being understood that it is preferable for the shape and the arrangement of the holes to be such that the metal segments remaining between the holes do not form any continuous line parallel to the axis of the sleeve throughout its whole length. Indeed, the existence of such continuous metal lines would prevent the method for manufacturing tubular elements which will be described further on from being implemented, for that method comprises a phase in which the sleeve is stretched, without any individual stretching of these metal segments.

In the case of expanded metal, the holes are in the shape of diamonds, and a diagonal of each of these diamonds is parallel to the axis of the sleeve. The metal segments remaining between the holes of the sleeve form two networks of helical lines. The lines of a same network are parallel to one another. The lines of a network have, in relation to the axis of the sleeve, an inclination symmetrical to that of the lines of the other network. It is however evidently possible to form the holes perforated in sleeve constituting the large grid 109 with shapes different from that of a diamond. That sleeve may, for example, be constitued before having been stretched, by wires which are, in one case, parallel to the axis of the sleeve, and in another case, circular and perpendicular to the axis of the sleeve. In that case, taking three successive wires into consideration, each of these wires forming a complete circle, the wires parallel to the axis connecting the first circle to the second must be staggered in relation to the wires parallel to the axis connecting the second circle to the third.

The positive collector constituted by the grids 108 and 109 is connected to the positive terminal of the storage battery. That positive collector and the active layer 6 are also coated with a water repellent layer 10 which is porous and unalterable.

The tubular elements of the type which has just been described may be produced as follows:

Firstly, a coaxial tubular structure comprising the grids 102 and 103, the separator 4, the active layer 6 and the fine grid 108 is formed. Then, that tubular structure has a cylindrical sleeve constituted as previously stated fitted round it, that is, that sleeve is constituted by an unalterable metal which may undergo plastic deformation, and it is perforated with holes which do not form any continuous line parallel to the axis of the sleeve along its whole length. This sleeve is then subjected to traction parallel to its axis, with sufficient force to cause plastic deformation. That deformation results in an increase in the length of the sleeve, parallel to its axis, and in a reduction in its diameter, that is, in its cross-section. Such a type of deformation would evidently not be possible if certain of the metal parts remaining between the holes formed continuous lines parallel to the axis of the sleeve along the whole of its length. On the contrary, the arrangement according to the invention makes it possible, by a simple traction in the direction of the axis, to obtain a radial compression of the tubular element, so as to ensure good contact between the various coaxial elements which constitute it.

It is quite evident that the radical compression thus obtained must be permanent, that is, the deformation of the metal constituting the sleeve must be of the plastic type, and not of the resilient type. It is preferable for the large grid 103 which finally is subjected to the compression effort exerted by the sleeve finally to constitute the grid 109. The tubular element assembly is then radially fitted between the large grids 103 and 109. The outside layer 10 previously mentioned is formed round the large grid 109. The electrical connections may be formed, for example, by means of metal rings 40 and 42 welded by the end sections of the large grids 103 and 109 respectively. A U-shaped plastic seal 44 may be fitted round the end portions of the separator 4 and of the active layer 6, thus ensuring proper fluid-tight sealing when the sleeve which constitutes the large grid 109 is stretched. That plastic seal is, indeed, in that instance, flattened by the rings 42 and 40, on the end portions of the layers 4 and 6.

The diameter of such reaction elements is, to great advantage, comprised between 1 and 4 cm, and, moreover, preferably between 2 and 3 cm, when the storage battery is provided to supply the propulsive power necessary for a highway vehicle, more particular a motor car.

Figure 5:
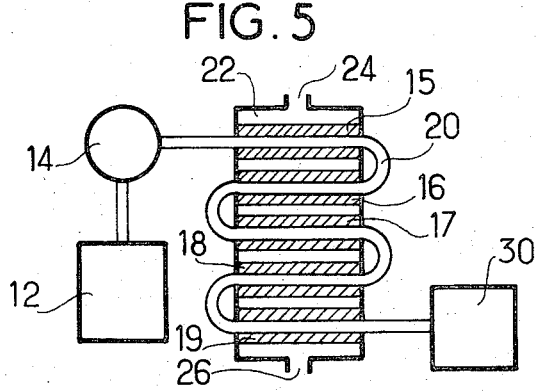
FIG. 5 shows diagrammatically a storage battery according to the invention, as a whole.

FIG. 5 shows in a very diagrammatical way the electrochemical storage battery according to the invention, as a whole.

It comprises an input tank 12 containing a potash solution with powdered zinc in suspension. That suspension is directed by the pump 14 towards reaction elements 15, 16, 17, 18 and 19 connected together in series by tubing such as 20. The number of these elements is, in practice, much greater than five, but it has been limited to five in the figure to make it easier to understand. The inside diameters of the reaction elements and of the tubing such as 20 are the same, so that the speed of the solution containing the zinc in suspension to be the same everywhere. That arrangement dispenses with low-speed zones where the zinc tended to be deposited in known storage batteries. The reaction elements are surrounded by an air chamber 22 provided with an air inlet 24 and an air outlet 26. The outlet of the storage battery communicates with an output tank 30.

Obviously, it is possible to provide means for regenerating the solution collected in the output tank 30 and for re-inserting it in the input tank 12.

It must be understood that the invention is in no way limited to the embodiment described and illustrated, which has been given only by way of an example. More particularly, without going beyond the scope of the invention, certain arrangements may be changed or certain means may be replaced by equivalent means.

What is claimed is:

1. A method of manufacturing electrochemical storage battery elements having an inside space for the flow of an alkaline solution containing a powered metal in suspension and an outside space for the flow of an oxidising gas, said method comprising the steps of producing a coaxial tubular structure comprising, from the inside towards the outside, the following layers in contact with one another:

a metallic, unalterable, negative collector, permeable to said alkaline solution and capable of withstanding a radial compression, a porous, water-repellant, insulating, unalterable separator permeable to said alkaline solution but not to said powered metal in suspension, a porous and electronically conductive active layer enabling, within itself, a reducing reaction for the said oxidising gas in contact with the said alkaline solution, and a fine grid;

fitting around said coaxial tubular structure a tubular sleeve composed of an unalterable metal which may undergo deformation and which is perforated with holes so that the metal segments remaining between the holes do not form any continuous line throughout its whole length parallel to the axis of said tubular sleeve, and subjecting said tubular sleeve to traction parallel to its axis, thereby increasing its length and decreasing its cross-sectional area by plastic deformation until said coaxial tubular structure is permanently radially compressed by said tubular sleeve, said tubular sleeve thereupon constituting, at least partly, a positive collector in electrical contact with said porous and electrically conductive active layer.

2. A method according to claim 1, characterised in that the said metal segments remaining between the holes of the said tubular sleeve form two networks of helical lines, the lines of each network being parallel to one another, the lines of a network having, in relation to the axis of the sleeve, an inclination symmetrical to that of the lines of the other network, whereby the said holes are shaped like diamonds each having a diagonal parallel to the axis of the sleeve.

3. A method as claimed in claim 1 and further comprising the step of fitting a porous, unalterable, water-repellent layer around said cylindrical sleeve.

4. A method as claimed in claim 1 wherein said negative collector, said separator, said active layer, and said positive conductor all have a circular cross-section and are positioned coaxially.

5. A method as claimed in claim 1 and further comprising the step of fitting a U-shaped plastic seal around the end portions of said separator and said active layer to ensure proper fluid-tight sealing when said sleeve is subjected to traction parallel to its axis.

* * * * *